(12) United States Patent
Shiroishi

(10) Patent No.: US 11,613,299 B2
(45) Date of Patent: Mar. 28, 2023

(54) STEERING DEVICE

(71) Applicant: YAMADA MANUFACTURING CO., LTD., Kiryu (JP)

(72) Inventor: Yoshinori Shiroishi, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 0 days.

(21) Appl. No.: 17/833,138

(22) Filed: Jun. 6, 2022

(65) Prior Publication Data

US 2022/0396302 A1    Dec. 15, 2022

(30) Foreign Application Priority Data

Jun. 10, 2021  (JP) .............................. JP2021-097389

(51) Int. Cl.
  B62D 1/19   (2006.01)
  B62D 1/185  (2006.01)

(52) U.S. Cl.
  CPC ............. B62D 1/192 (2013.01); B62D 1/185 (2013.01)

(58) Field of Classification Search
  CPC ......... B62D 1/192; B62D 1/185; B62D 1/184
  See application file for complete search history.

(56) References Cited

U.S. PATENT DOCUMENTS

| | | | |
|---|---|---|---|
| 11,014,599 B2 * | 5/2021 | Kirmsze | B62D 1/197 |
| 2008/0100050 A1 * | 5/2008 | Menjak | B62D 1/195 |
| | | | 280/777 |
| 2018/0251148 A1 * | 9/2018 | Osawa | B62D 1/195 |
| 2019/0185045 A1 * | 6/2019 | Takahashi | B62D 1/195 |
| 2020/0039567 A1 * | 2/2020 | Sekiguchi | B62D 1/181 |
| 2022/0306182 A1 * | 9/2022 | Shiroishi | B62D 1/185 |
| 2022/0396301 A1 * | 12/2022 | Shiroishi | B62D 1/192 |

FOREIGN PATENT DOCUMENTS

| JP | 2004-338551 | 12/2004 | |
|---|---|---|---|
| WO | WO-2015156050 A1 * | 10/2015 | ............. B62D 1/184 |

* cited by examiner

*Primary Examiner* — Drew J Brown

(74) *Attorney, Agent, or Firm* — Rankin, Hill & Clark LLP

(57) ABSTRACT

A steering device includes an inner column, an outer column, a hanger bracket, and a fixing member. The hanger bracket has a guide hole which extends in the front-rear direction and through which the shaft portion of the fixing member passes. An edge portion of the guide hole is provided with a first region with which the seat portion of the fixing member comes into contact to fix the hanger bracket to the inner column and a second region which is disposed in front of the first region and faces the seat portion when the seat portion is displaced forward together with the inner column by a secondary collision load being input. A frictional restraining force between the seat portion and the edge portion of the guide hole in a state where the seat portion is displaced to a position opposite the second region is set to be smaller than a frictional restraining force between the seat portion and the edge portion of the guide hole at a position where the seat portion faces the first region.

8 Claims, 10 Drawing Sheets

STEERING DEVICE

CROSS-REFERENCE TO RELATED APPLICATION

Priority is claimed on Japanese Patent Application No. 2021-097389, filed Jun. 10, 2021, the content of which is incorporated herein by reference.

BACKGROUND OF THE INVENTION

Field of the Invention

The present invention relates to a steering device.

Description of Related Art

Some steering devices have a telescopic function for adjusting a front-rear position of a steering wheel according to a physique or a driving posture of a driver. This type of steering device includes an inner column that rotatably supports a steering shaft and an outer column that movably supports the inner column in a front-rear direction.

The steering device is installed with a mechanism that alleviates an impact load applied to the driver in a process in which the inner column moves forward with respect to the outer column (a collapse stroke) in a case where a predetermined load acts on the steering wheel from an occupant during a secondary collision.

Here, for example, Patent Document 1 below discloses a configuration in which a steering column is supported by a bracket via tilt plates provided on both left and right sides of the steering column. Specifically, in the configuration of Patent Document 1 below, the steering column is supported by a tilt pin protruding from the bracket being held in a hole portion formed in the tilt plate. An elongated hole for a guide is formed in the tilt plate to be continuous behind the hole portion. A bulging portion whose bulging height gradually increases toward the rear is fixed to a lower surface of the steering column on a front side in a support position by the bracket.

In the steering device described in Patent Document 1, the tilt pin comes out of the hole portion and moves relative to the inside of the elongated hole as the inner column moves forward during the collapse stroke. At this time, a posture of the steering column is stabilized by a guidance function of the elongated hole and the bracket comes into contact with the bulging portion, and thus the bulging portion is gradually crushed and an energy of the impact load is absorbed.

PATENT DOCUMENTS

[Patent Document 1] Japanese Unexamined Patent Application, First Publication No. 2004-338551

SUMMARY OF THE INVENTION

However, in the above-mentioned steering device, there is still room for improvement in obtaining stable energy absorption performance when a secondary collision load is input while reducing the size and cost.

An aspect according to the present invention has been made in view of the above-mentioned problems, and an object of the present invention is to provide a steering device able to obtain stable energy absorption performance when a secondary collision load is input while reducing the size and cost.

The present invention has adopted the following configuration in order to solve the above problems.

(1) A steering device according to an aspect of the present invention includes: an inner column that rotatably supports a steering shaft; an outer column which is supported by a vehicle body in a state where displacement thereof in a front-rear direction is restricted and in which the inner column is inserted such that a position thereof can be adjusted in the front-rear direction; a hanger bracket that is attached to the inner column and has a stopper portion which restricts excessive displacement of the inner column by coming into contact with a displacement restricting portion on a side of the outer column when the inner column is displaced in the front-rear direction; and a fixing member that has a shaft portion which passes through the hanger bracket and of which one end side is coupled to the inner column and a seat portion which is provided on the other end side of the shaft portion to press and fix the hanger bracket against and to the inner column, wherein the hanger bracket has a guide hole which extends in the front-rear direction and through which the shaft portion of the fixing member passes, wherein an edge portion of the guide hole of the hanger bracket is provided with a first region with which the seat portion of the fixing member comes into contact to fix the hanger bracket to the inner column, and a second region which is disposed adjacent to a front side of the first region and faces the seat portion when the seat portion is displaced forward together with the inner column by a secondary collision load being input to the steering shaft, and wherein a frictional restraining force between the seat portion and the edge portion of the guide hole in a state where the seat portion is displaced to a position opposite the second region is set to be smaller than a frictional restraining force between the seat portion and the edge portion of the guide hole at a position where the seat portion faces the first region.

With the above configuration, when a front-rear position of the inner column is adjusted, the stopper portion of the hanger bracket comes into contact with the displacement restricting portion on a side of the outer column, and thus excessive displacement of the inner column is restricted. At this time, since the hanger bracket is integrally fixed to the inner column by the fixing member, excessive displacement of the inner column in the front-rear direction is restricted via the hanger bracket.

On the other hand, when the secondary collision load is input to the steering shaft from an occupant with the front-rear position of the inner column fixed at an arbitrary position, the inner column moves forward against the restraining force of the inner column by the outer column. When the inner column is displaced forward by a set amount, the stopper portion of the hanger bracket comes into contact with the displacement restricting portion on a side of the outer column. At this time, when the input of the secondary collision load to the steering shaft continues, a reaction force received by the hanger bracket from the displacement restricting portion on a side of the outer column increases. As a result, the fixing member is displaced forward together with the inner column against the frictional restraining force on the first region (the edge portion of the guide hole) of the hanger bracket by the seat portion of the fixing member. At this time, in the second region disposed adjacent to the front side of the first region, the frictional restraining force between the seat portion of the fixing member and the edge portion of the guide hole is relatively small, and thus the fixing member is smoothly displaced to a region where the seat portion faces the second region. That is, the fixing member initiates relative displacement with respect to the hanger bracket with a relatively small initial operating load. After that, the inner column is smoothly displaced further forward against the restraining force by the hanger bracket and the restraining force by the outer column while the shaft portion of the fixing member is guided by the guide hole. The energy of the secondary collision load input from the occupant to the steering shaft is stably absorbed during this period.

(2) In the above aspect (1), the second region may be set to have a protrusion height in a direction toward the seat portion lower than that of the first region.

In this case, since the protrusion height of the second region toward the seat portion of the fixing member is lower than that of the first region, a frictional force acting between the seat portion and the edge portion of the guide hole in the second region is smaller than a frictional force acting between the seat portion and the edge portion of the guide hole in the first region. This configuration is a simple configuration in which the protrusion height of the second region in a direction toward the seat portion of the fixing member is lower than the protrusion height of the first region, can keep the initial operating load relatively small when the secondary collision load is input, and can absorb the energy of the secondary collision load smoothly.

In the present configuration, since the protrusion height of the second region in a direction toward the seat portion of the fixing member is lower than the protrusion height of the first region, when the seat portion of the fixing member is relatively displaced to the position opposite the second region at the time of input of the secondary collision load, a pressing load of the hanger bracket against the inner column by the seat portion is also reduced. As a result, the frictional resistance between the hanger bracket and the inner column becomes smaller. Therefore, in a case where the present configuration is adopted, the operation on a latter stage of a collapse stroke at the time of input of the secondary collision load can be made smoother, and energy absorption performance can be further improved.

(3) In the above aspect (2), the first region and the second region may be formed of an integral metal member.

In this case, the first region and the second region having different protrusion heights can be easily formed by press molding or the like, and the number of parts can be reduced.

(4) In the above aspect (2), a spacer member may be disposed in the first region such that a height in the direction toward the seat portion is higher than that of the second region.

In this case, it is possible to easily change the heights of the first region and the second region simply by arranging the spacer member which is a separate body in the first region of the hanger bracket. Therefore, in a case where the present configuration is adopted, the structure of the main body portion (a portion other than the spacer member) of the hanger bracket can be simplified, and the productivity can be further improved.

(5) In any one of the above aspects (1) to (4), the fixing member may be constituted by a fastening member capable of managing tightening torque.

In this case, by adopting the fastening member as the fixing member and managing the tightening torque of the fastening member, the frictional restraining force of the seat portion of the fixing member on the hanger bracket can be accurately set and adjusted. Therefore, in a case where the present configuration is adopted, the hanger bracket can be securely fixed to the inner column during normal use, and stable energy absorption performance can be obtained according to settings when the secondary collision load is input.

(6) In any one of the above aspects (1) to (5), a plurality of the fixing members may be disposed at positions of the inner column separated from each other in an axial direction, the hanger bracket may be fixed at a plurality of positions of the inner column separated from each other in the axial direction by each of the fixing members, and the hanger bracket may be provided with the first region and the second region to correspond to each of the fixing members.

In this case, when the secondary collision load is input, the guide action by the shaft portion of the fixing member and the guide hole, and the fixing and sliding at the seat portion of the fixing member and the edge portion of the guide hole can be shared by the plurality of fixing members. Therefore, the behavior (the collapse stroke) of the inner column at the time of input of the secondary collision load can be further stabilized.

In the present configuration, since the hanger bracket is fixed to the inner column by the plurality of fixing members at positions separated in the front-rear direction, when the stopper portion of the hanger bracket comes into contact with the displacement restricting portion on a side of the outer column, it is possible to prevent the end portions of the hanger bracket in the front-rear direction from being separated (floating) from the inner column. Therefore, in a case where the present configuration is adopted, the commercial value of the steering device for adjusting the front-rear position of the inner column can be enhanced, and the operation of the hanger bracket or the inner column can be stabilized when the secondary collision load is input.

(7) In the above aspect (6), the second region corresponding to a part of the fixing member may be configured such that the frictional restraining force between the seat portion and the edge portion of the guide hole in a state where the seat portion of the fixing member is displaced to a position opposite the second region is the same as the friction binding force between the seat portion and the edge portion of the guide hole in the first region.

In this case, in the seat portion of a part of the fixing member, the frictional restraining force with respect to the hanger bracket does not change at the initial stage of operation and the latter stage of operation when the secondary collision load is input. Therefore, the sliding resistance in the latter stage of operation at the time of input of the secondary collision load can be further increased, and the amount of energy absorbed during the collapse stroke can be increased.

(8) In the above aspect (1), the second region may have a protrusion height in a direction toward the seat portion gradually decreasing from a rear end portion toward a front side.

In this case, when the seat portion of the fixing member is displaced from the position opposite the first region to the position opposite the second region at the time of input of the secondary collision load, the frictional restraining force on the edge portion of the guide hole by the seat portion of the fixing member is gradually reduced according to the forward displacement of the fixing member (the inner column). As a result, the displacement of the inner column in the latter stage of the collapse stroke becomes smoother.

In the aspects of the present invention, when the secondary collision load is input, the posture of the inner column can be stably maintained by the guiding action by the guide hole of the hanger bracket and the shaft portion of the fixing member, and it is possible to smoothly displace the seat portion of the fixing member from the position opposite the first region of the hanger bracket to the position opposite the second region of the hanger bracket and to smoothly absorb the energy of the secondary collision load. Therefore, in the aspects of the present invention, stable energy absorption performance can be obtained when the secondary collision load is input while the structure is simple and does not cause an increase in size or cost.

DETAILED DESCRIPTION OF THE INVENTION

Hereinafter, embodiments of the present invention will be described with reference to the drawings. In each of the embodiments which will be described below, the same reference signs will be given to the common parts, and some duplicate explanations will be omitted.

First Embodiment

Figure 1:
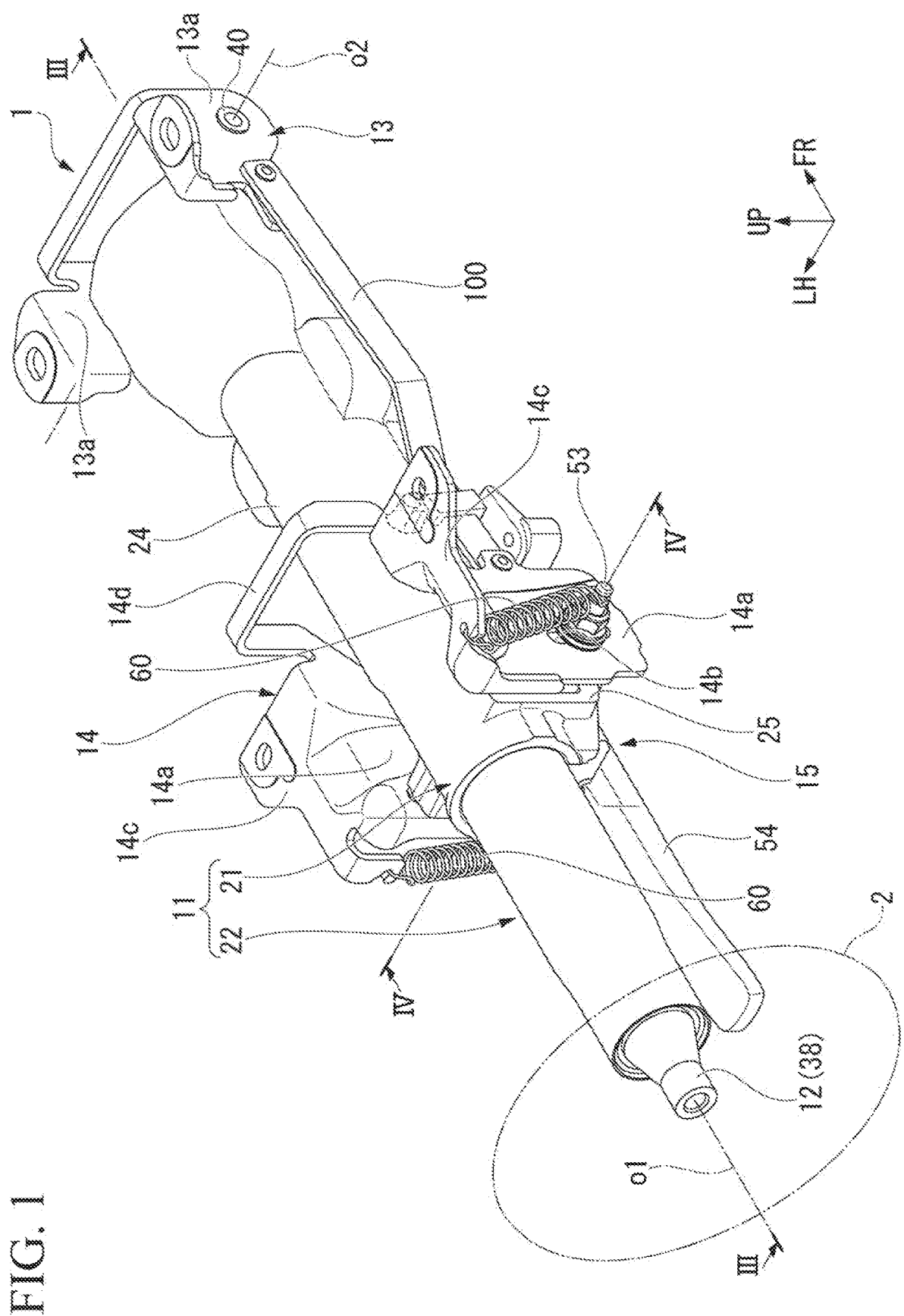
FIG. 1 is a perspective view of a steering device of a first embodiment.
Figure 2:
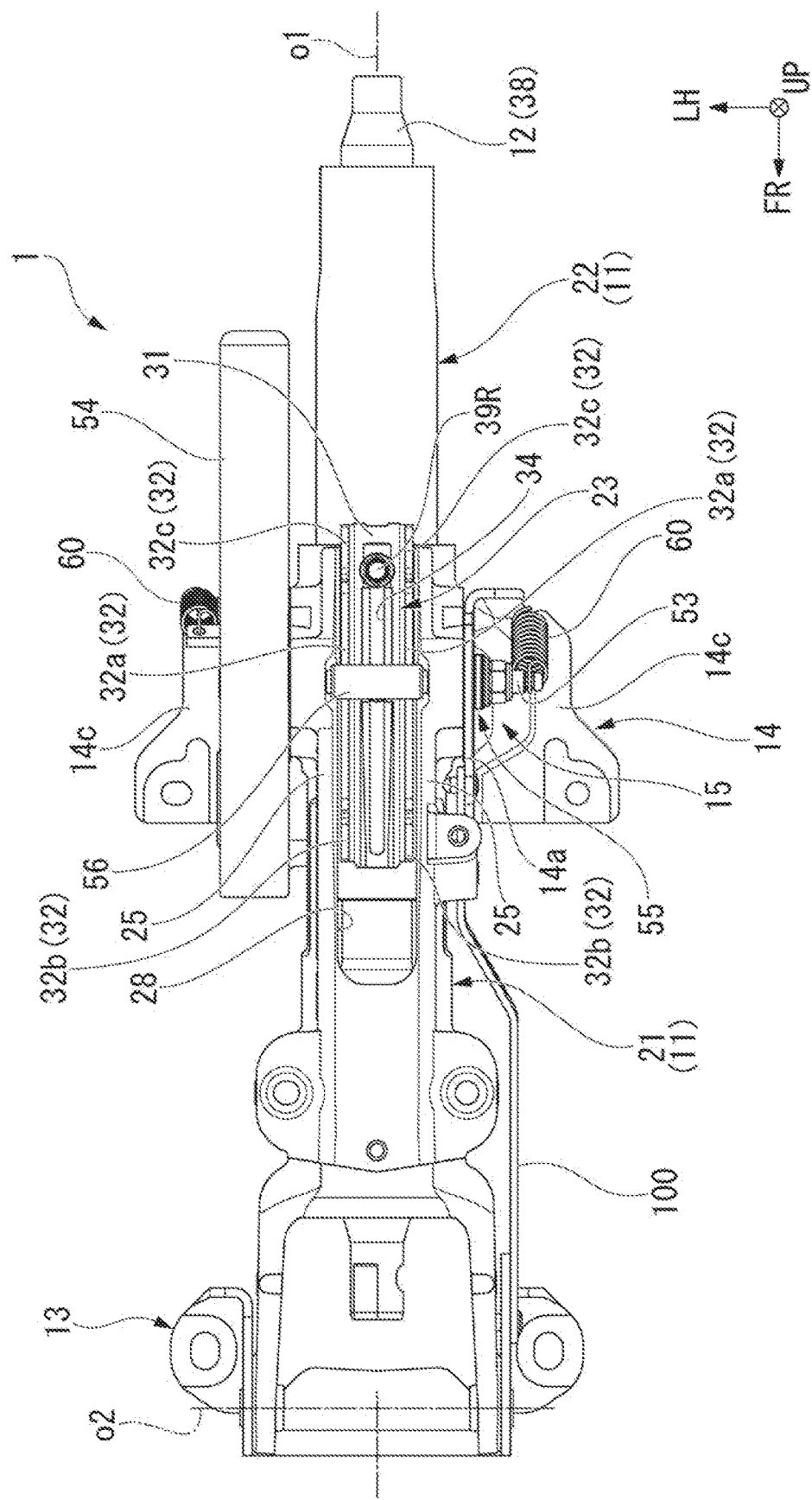
FIG. 2 is a bottom view of the steering device of the first embodiment.
Figure 3:
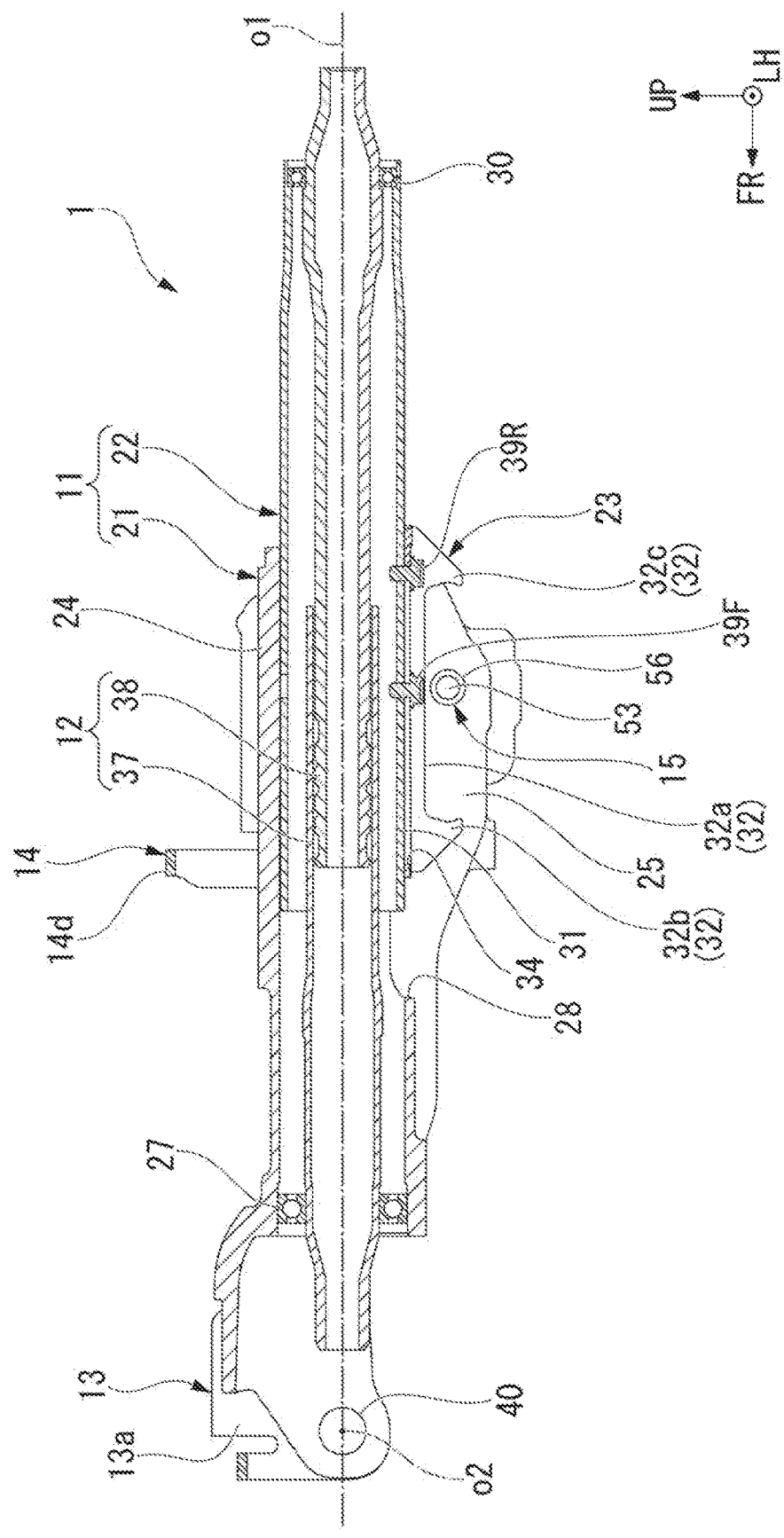
FIG. 3 is a cross-sectional view along a line III-III of FIG. 1.

FIG. 1 is a perspective view of a steering device 1 of the present embodiment, and FIG. 2 is a bottom view of the steering device 1. FIG. 3 is a cross-sectional view along a line III-III of FIG. 1.

The steering device 1 is disposed in front of a driver's seat of a vehicle. The steering device 1 adjusts a steering angle of front wheels of the vehicle by a rotation operation of a steering wheel 2 performed by a driver. The steering device 1 has a telescopic function for adjusting a front-rear position of the steering wheel 2 according to a physique or a driving posture of a driver and a tilt function for adjusting a tilt angle of the steering wheel 2 in a vertical direction according thereto. Hereinafter, an operation of the steering device 1 by the telescopic function is referred to as a "telescopic operation."

The steering device 1 includes a column unit 11, a steering shaft 12, a front bracket 13, a rear bracket 14, and a lock mechanism 15. The column unit 11 and the steering shaft 12 are each formed along an axis o1. In the following description, in some cases, an extending direction of the axis o1 of the column unit 11 and the steering shaft 12 is simply referred to as a shaft axial direction, a direction orthogonal to the axis o1 is referred to as a shaft radial direction, and a direction around the axis of is referred to as a shaft circumferential direction.

The steering device 1 of the present embodiment is installed on the vehicle in a state where the axis o1 is inclined in the vertical direction with respect to a front-rear direction of the vehicle. Specifically, the axis o1 of the steering device 1 is inclined such that a height increases toward the rear. However, in the following description, for convenience of explanation, in the steering device 1, a direction toward the steering wheel 2 in the shaft axial direction is simply referred to as a rear direction, and a direction toward a side opposite to the steering wheel 2 is simply referred to as a front direction. In the shaft radial direction, a vertical direction in a case where the steering device 1 is attached to the vehicle is simply a vertical direction, and a left-right direction in that case is simply a left-right direction.

In the figure, an arrow FR pointing "forward," an arrow UP pointing "upward," and an arrow LH pointing "left" are shown.

<Column Unit 11>

The column unit 11 includes an outer column 21, an inner column 22, and a hanger bracket 23.

Figure 4:
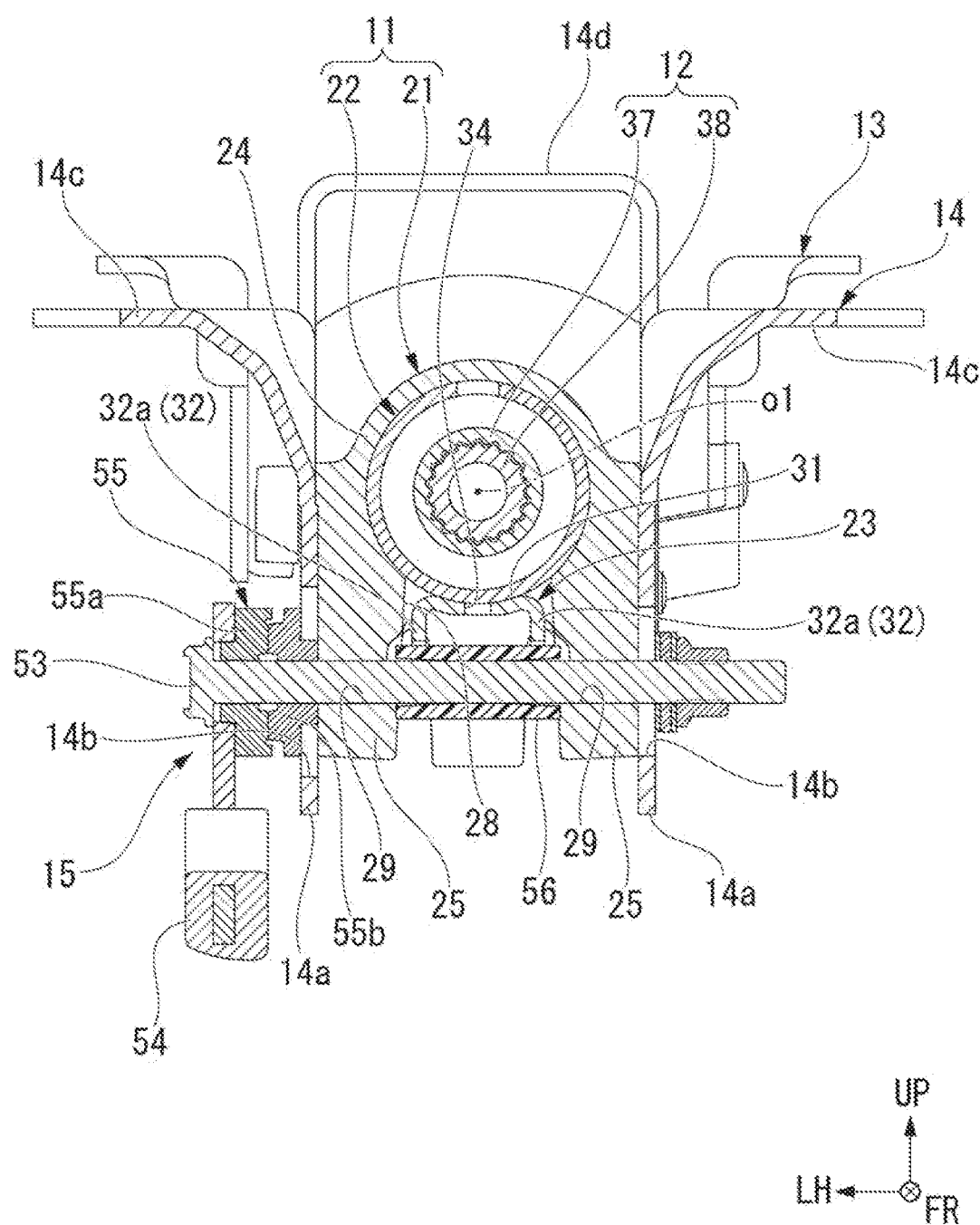
FIG. 4 is a cross-sectional view along a line IV-IV of FIG. 1.

FIG. 4 is a cross-sectional view along a line IV-IV of FIG. 1.

The outer column 21 is fixed to a vehicle body via a front bracket 13 and a rear bracket 14. The outer column 21 includes a holding cylinder portion 24 and a pair of tightening portions 25.

The holding cylinder portion 24 is formed in a cylindrical shape extending in the front-rear direction. As shown in FIG. 3, a front bearing 27 is fitted (press-fitted) to a front end portion in the holding cylinder portion 24. A slit 28 extending in the front-rear direction is formed in a region other than the front end portion of the holding cylinder portion 24. In a case of the present embodiment, the slit 28 is provided on a lower side of the outer column 21. The slit 28 penetrates the outer column 21 in the shaft radial direction and is open to a rear end side of the outer column 21.

As shown in FIG. 4, the tightening portions 25 extend downward from positions of the holding cylinder portion 24 facing each other in the left-right direction with the slit 28 interposed therebetween. A through hole 29 that penetrates the tightening portion 25 in the left-right direction is formed in each tightening portion 25.

As shown in FIGS. 1 and 3, the inner column 22 is formed in a cylindrical shape and extends in the front-rear direction. An outer diameter of the inner column 22 is smaller than an inner diameter of the holding cylinder portion 24. The inner column 22 is inserted into the holding cylinder portion 24 from the rear. The inner column 22 is configured to be movable in the front-rear direction with respect to the outer column 21. As shown in FIG. 3, a rear bearing 30 is fitted (press-fitted) to a rear end portion in the inner column 22.

Figure 5:
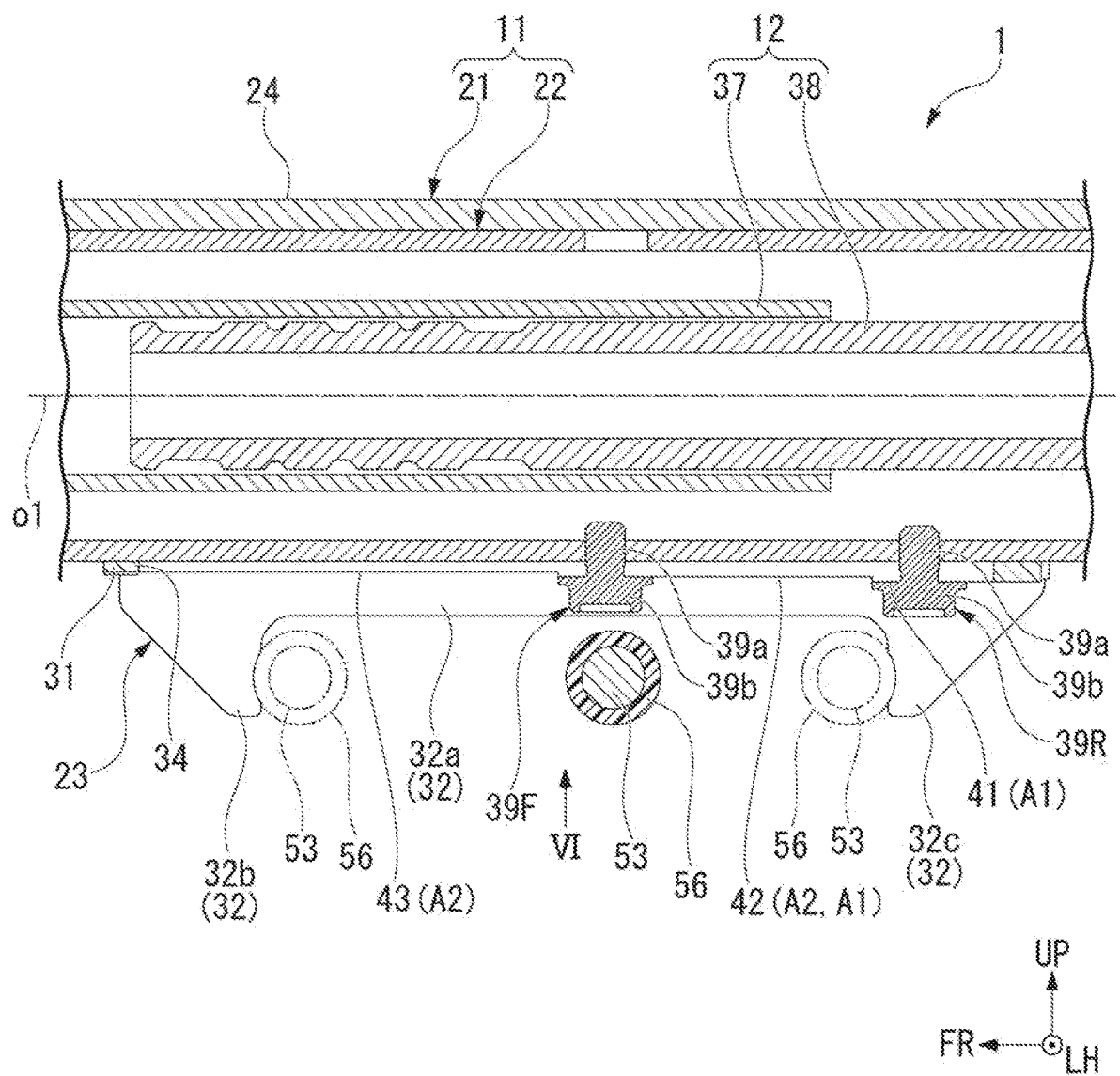
FIG. 5 is an enlarged view of a main pad of FIG. 3.

FIG. 5 is an enlarged view of a main part of FIG. 3.

As shown in FIGS. 4 and 5, the hanger bracket 23 is fixed to a lower surface of the inner column 22 near a front portion to face downward. In the present embodiment, the hanger bracket 23 is integrally formed of a metal material. It is possible to form the hanger bracket 23 by, for example, performing press working on a metal plate. As shown in FIG. 2, the hanger bracket 23 is exposed to the outside (downward) of the holding cylinder portion 24 through the slit 28 of the holding cylinder portion 24. As shown in FIG. 4, the hanger bracket 23 is formed substantially in a U-shape that is open downward in a front view when viewed in the front-rear direction.

Figure 6:
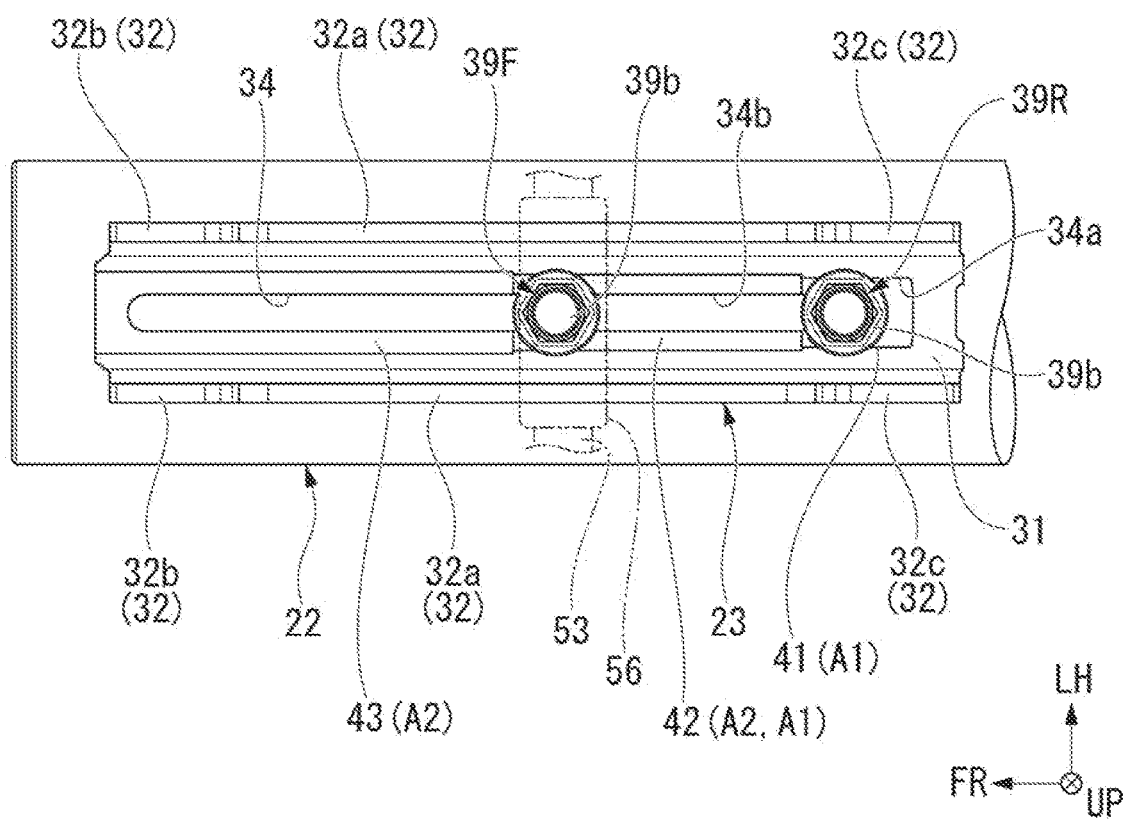
FIG. 6 is a view in a direction of an arrow VI of FIG. 5.

FIG. 6 is a view in a direction of an arrow VI of FIG. 5. In FIG. 6, a collar 56 and a lock bolt 53, which will be described later, are drawn by a virtual line.

The hanger bracket 23 includes an attachment plate portion 31 disposed in the axial direction of the inner column 22 and a pair of side walls 32 extending downward from both end portions of the attachment plate portion 31 in the left-right direction.

The attachment plate portion 31 extends in the front-rear direction along the lower surface of the inner column 22 with the vertical direction as a plate thickness direction. The attachment plate portion 31 is formed substantially in a rectangular shape that, is long in the front-rear direction in a bottom view. A guide hole 34 that penetrates the attachment plate portion 31 in the vertical direction is formed in the attachment plate portion 31. The guide hole 34 is constituted by a slit-shaped hole extending long in the front-rear direction as compared with a width in the left-right direction. The detailed shape of the guide hole 34 will be described later.

The hanger bracket 23 is fixed at two positions of the lower surface of the inner column 22 separated in the front-rear direction from each other by two bolts 39F and 39R each of which is a fastening member (a fixing member). As shown in FIG. 5, each of the bolts 39F and 39R has a shaft portion 39a which vertically passes through the attachment plate portion 31 (a portion of the guide hole 34) of the hanger bracket 23 and of which one end side (an upper end side) is coupled to the inner column 22 and a head portion 39b integrally provided on the other end side (a lower end side) of the shaft portion 39a. The head portion 39b comes into contact with the attachment plate portion 31 (an edge portion of the guide hole 34) of the hanger bracket 23 and presses the attachment plate portion 31 against the lower surface of the inner column 22 to fix the hanger bracket 23 to the inner column 22. The shaft portion 39a of the bolt 39R on the rear side is coupled to the lower surface of the inner column 22 at an approximately central position in the axial direction, and the shaft portion 39a of the bolt 39F on the front side is coupled to the lower surface of the inner column 22 on a front side from the central position.

In the present embodiment, the head portion 39b of each of the bolts 39F and 39R constitutes a seat portion in the fastening member (the fixing member).

In the present embodiment, a configuration in which the bolts 39F and 39R are directly fixed to the inner column 22 as the fastening member (the fixing member) has been described, but the present invention is not limited to this configuration. For example, the bolts 39F and 39R may be fastened to the inner column 22 by being screwed into nuts provided inside the inner column 22. The fastening member (the fixing member) may be constituted by a stud bolt projecting from the inner column 22 and a nut screwed onto the stud bolt. In this case, the nut constitutes the seat portion.

Further, the fixing member is not limited to the fastening members, and a rivet or the like having no screwing means can be used. If the fixing member is constituted by a rivet, the head portion of the rivet constitutes the seat portion.

The side wall 32 of the hanger bracket 23 is formed over the entire area of the attachment plate portion 31 in the front-rear direction. The side wall 32 includes a telescopic guide portion 32a having a constant down protrusion height and a pair of stopper portions 32b and 32c having a higher protrusion height than the telescopic guide portion 32a.

The telescopic guide portion 32a is formed in a region of the side wall 32 excluding both front and rear ends. A lower end edge of the telescopic guide portion 32a is formed linearly in the front-rear direction. One (32b) of the stopper portions 32b and 32c is integrally formed with a front end portion of the telescopic guide portion 32a, and the other (32c) is integrally formed with a rear end portion of the telescopic guide portion 32a. The front and rear stopper portions 32b and 32c project downward with respect to the telescopic guide portion 32a.

The front stopper portion 32b restricts rearward displacement of the inner column 22 with respect to the outer column 21 by coming into contact with the lock bolt 53, which will be described later, via the collar 56 during the telescopic operation. The rear stopper portion 32c restricts forward displacement of the inner column 22 with respect to the outer column 21 by coming into contact with the lock bolt 53, which will be described later, via the collar 56 during the telescopic operation. A rear edge portion of the front stopper portion 32b and a front edge portion of the rear stopper portion 32c are formed in an arc shape substantially matching an arc shape of an outer peripheral surface of the collar 56.

<Steering Shaft 12>

As shown in FIG. 3, the steering shaft 12 includes an outer shaft 37 and an inner shaft 38.

The outer shaft 37 is formed in a hollow cylindrical shape extending in the front-rear direction. The outer shaft 37 is inserted in the column unit 11. A front end portion of the outer shaft 37 is press-fitted to the front bearing 27 in the outer column 21. As a result, the outer shaft 37 is rotatably supported by the outer column 21 around the axis o1. The front end portion of the outer shaft 37 (a portion protruding forward from the front bearing 27) is connected to, for example, a steering gear box (not shown) via a universal joint (not shown) or the like.

Like the outer shaft 37, the inner shaft 38 is formed in a hollow cylindrical shape extending in the front-rear direction. The inner shaft 38 is inserted in the inner column 22. A rear end portion of the inner shaft 38 is press-fitted to the rear bearing 30 in the inner column 22. As a result, the inner shaft 38 is rotatably supported by the inner column 22 around the axis o1. The steering wheel 2 (see FIG. 1) is integrally rotatably connected to a portion of the inner shaft 38 protruding rearward from the inner column 22.

A front end portion of the inner shaft 38 is inserted into the outer shaft 37 in the inner column 22. The inner shaft 38 is configured to be displaceable in the front-rear direction with respect to the outer shaft 37 together with the inner column 22 as the inner column 22 moves in the front-rear direction with respect to the outer column 21.

In the present embodiment, a female spline is formed in an inner peripheral surface of the outer shaft 37. The female spline engages with a male spline formed on an outer peripheral surface of the inner shaft 38. As a result, the inner shaft 38 is displaced in the front-rear direction with respect to the outer shaft 37 after relative rotation with respect to the outer shaft 37 is restricted. However, an expansion and contraction structure or a rotation restriction structure of the steering shaft 12 can be changed as appropriate.

In the present embodiment, a configuration in which the outer shaft 37 is disposed in front of the inner shaft 38 has been described, but the present invention is not limited to this configuration, and a configuration in which the outer shaft 37 is disposed behind the inner shaft 38 is also possible.

<Front Bracket 13>

As shown in FIG. 1, the front bracket 13 is formed in a U-shape that is open downward in a front view. The front bracket 13 surrounds a front end portion of the outer column 21 from the upper side and both sides in the left-right direction. Of the front brackets 13, front side walls 13a located on both sides in the left-right direction are rotatably connected to the front end portion of the outer column 21 via a pivot shaft 40. As a result, the outer column 21 is supported by the front bracket 13 to be rotatable around an axis o2 extending in the left-right direction of the pivot shaft 40. Therefore, the front end portion of the outer column 21 is supported by the vehicle body to be rotatable around the axis o2 and with the displacement in the front-rear direction restricted.

<Rear Bracket 14>

The rear bracket 14 is formed substantially in a U-shape that is open downward in a front view. The rear bracket 14 surrounds the upper side and the left and right sides of a rear region of the outer column 21. The rear bracket 14 holds the rear region of the outer column 21 via the lock mechanism 15 which will be described later. Since the rear bracket 14 is fixed to the vehicle body side by bolting or the like, the rear region of the outer column 21 is supported by the vehicle body via the lock mechanism 15 and the rear bracket 14.

In the rear bracket 14 of the present embodiment, a single metal plate cut out into a predetermined shape is formed into a predetermined shape by press working or the like. The rear bracket 14 includes rear side walls 14a disposed on the left and right sides of the column unit 11, a fixed flange 14c extending to be curved outward from the upper end portion of each of the left and right rear side walls 14a in the left-right direction, and a connecting wall 14d that connects the rear portions of the left and right rear side walls 14a to each other. The connecting wall 14d is disposed forward from the left and right fixed flanges 14c and the left and right rear side walls 14a and is formed to be folded substantially in a U-shape such that it straddles the upper part of the holding cylinder portion 24 of the outer column 21 on the left and right.

As shown in FIG. 4, a tilt guide hole 14b that penetrates the rear side walls 14a in the left-right direction is formed in each of the left and right rear side walls 14a. The tilt guide hole 14b is formed in an arc shape centered on the axis o2 of the pivot shaft 40.

A shaft portion of the lock bolt 53 of the lock mechanism 15, which will be described later, is inserted into the tilt guide hole 14b of each of the left and right rear side walls 14a. The shaft portion of the lock bolt 53 extends in the left-right direction. The tilt guide hole 14b allows the lock bolt 53 which is displaced integrally with the column unit 11 to swing in the vertical direction during a tilt operation in which the column unit 11 swings up and down about the pivot shaft 40.

The front bracket 13 and the rear bracket 14 are connected to each other by a connecting piece 100. The connecting piece 100 extends in the front-rear direction with the left-fight direction as the thickness direction and connects the front side wall 13a on the right side of the front bracket 13 and the rear side wall 14a on the right side of the rear bracket 14. However, the connecting piece 100 is not an essential configuration.

<Lock Mechanism 15>

As shown in FIG. 4, the lock mechanism 15 includes the lock bolt 53, an operation lever 54, and a fastening cam 55.

The lock bolt 53 passes through the tilt guide holes 14b of the left and right rear side walls 14a of the rear bracket 14 and the through holes 29 of the left and right tightening portions 25 of the outer column 21 in the left-right direction. A collar 56 is attached to a central region of the lock bolt 53 (a portion located between the left and right tightening portions 25 of the outer column 21). The collar 56 is formed in a cylindrical shape coaxial with the lock bolt 53. The collar 56 is made of a material that is softer than the lock bolt 53 (for example, an elastically deformable material such as rubber or a resin material).

As shown in FIG. 5, when the inner column 22 is in the foremost end position (when the column unit 11 is in the most contracted state) during the telescopic operation, the stopper portion 32c on the rear side of the hanger bracket 23 comes into contact with the collar 56 from the rear. When the inner column 22 is in the rearmost end position (when the column unit 11 is in the most extended state) during the telescopic operation, the stopper portion 32b on the front side of the hanger bracket 23 comes into contact with the collar 56 from the front. That is, when the hanger bracket 23 is displaced in the front-rear direction together with the inner column 22 during the telescopic operation, one of the front and rear stopper portions 32b and 32c of the hanger bracket 23 comes into contact with the lock bolt 53 via the collar 56, whereby the excessive displacement of the inner column 22 in the front-rear direction is restricted. During the telescopic operation, a lower edge portion of the telescopic guide portion 32a of the hanger bracket 23 guides the relative displacement of the collar 56 (the lock bolt 53) in the front-rear direction.

In the present embodiment, the lock bolt 53 constitutes a displacement restricting portion on a side of the outer column 21. In the present embodiment, a configuration in which the stopper portions 32b and 32c comes into contact with the lock bolt 53 via the collar 56 during the telescopic operation or the like has been adopted, but a configuration in which the collar 56 is removed and the stopper portions 32b and 32c come into direct contact with the lock bolt 53 may be possible.

As shown in FIGS. 1 and 2, a biasing member 60 such as a coil spring is interposed between the left and right end portions of the lock bolt 53 and the fixed flange 14c of the rear bracket 14. The biasing member 60 biases the lock bolt 53 upward with the fixed flange 14c of the rear bracket 14 fixed to the vehicle body side as a starting point. Here, since the lock bolt 53 engages with the tightening portion 25 of the outer column 21 in a penetrated state as shown in FIG. 4, due to a biasing force of the biasing member 60, the rear region of the outer column 21 is biased upward. Therefore, the biasing member 60 prevents the column unit 11 from lowering due to its own weight when the lock is released (during the tilt operation).

The operation lever 54 is supported by the left end portion of the shaft portion of the lock bolt 53. As shown in FIG. 4, the fastening cam 55 includes two mutually rotatable cam plates 55*a* and 55*b*. The shaft portion of the lock bolt 53 penetrates the two cam plates 55*a* and 55*b*. One cam plate 55*a* is connected to a base portion of the operation lever 54, and the other cam plate 55*b* is in contact with the side surface of the rear side wall 14*a* on the left side of the front bracket 13. One cam plate 55*a* rotates integrally with the base portion of the operation lever 54, and the other cam plate 55*b* is prevented from rotating by a tilt guide hole 14*b* or the like of the rear side wall 14*a* on the left side. The two cam plates 55*a* and 55*b* have cam protrusions (not shown) on surfaces facing each other. When the two cam plates 55*a* and 55*b* are in a rotational position where the cam protrusions of the two cam plates face each other, the total thickness of the two cam plates (an axial width in an axial direction of the lock bolt 53) increases. When the two cam plates 55*a* and 55*b* are in a rotational position where the cam protrusions of the two cam plates do not face each other, the total thickness of the two cam plates (an axial width in an axial direction of the lock bolt 53) decreases.

The lock mechanism 15 changes the total thickness of the fastening cam 55 by rotating the operation lever 54, whereby the left and right tightening portions 25 of the outer column 21 approach each other or are separated from each other. Specifically, when the operation lever 54 is rotated to increase the total thickness of the fastening cam 55, the left and right tightening portions 25 are deformed to approach each other against the metal elasticity of the outer column 21. As a result, the inner diameter of the holding cylinder portion 24 of the outer column 21 is reduced, and the inner column 22 is sandwiched and fixed by the holding cylinder portion 24. As a result, the displacement of the inner column 22 in the shaft axial direction with respect to the outer column 21 is restricted (a locked state). At this time, the edge portion of the tilt guide hole 14*b* is sandwiched and fixed by the fastening cam 55 and the tightening portion 25 of the outer column 21, and the tilt operation of the outer column 21 (the column unit 11) is also locked.

On the other hand, in the locked state, when the operation lever 54 is rotated to reduce the total thickness of the fastening cam 55, the left and right, tightening portions 25 are elastically restored to be separated from each other. As a result, the inner diameter of the holding cylinder portion 24 of the outer column 21 is expanded, and the sandwiching and fixing of the inner column 22 by the holding cylinder portion 24 is released. As a result, the movement of the inner column 22 in the shaft, axial direction with respect to the outer column 21 is allowed (an unlocked state). At this time, the sandwiching and fixing of the side edge portion of the tilt guide hole 14*b* by the fastening cam 55 and the tightening portion 25 of the outer column 21 is released, and the tilt operation of the outer column 21 (the column unit 11) is also allowed.

<Detailed Structure of Hanger Bracket 23>

In the steering device 1 of the present embodiment, the hanger bracket 23 is integrally fixed to the inner column 22 by the pair of bolts 39F and 39R. The fixing of the hanger bracket 23 by the bolts 39F and 39R is released when an excessive load acts on the steering shaft 12 and the inner column 22 forward from the occupant through the steering wheel 2 when the secondary collision load is input.

Specifically, when an excessive load acts on the inner column 22 forward from the occupant through steering wheel 2 and the steering shaft 12 at the time of inputting the secondary collision load, the inner column 22 is displaced forward against a restraining force by the outer column 21 (a binding force by the lock mechanism 15). At this time, when the inner column 22 is displaced forward by a predetermined amount, the stopper portion 32*c* of the hanger bracket 23 fixed to the inner column 22 comes into contact with the lock bolt 53 via the collar 56 and receives a reaction force from the lock bolt 53. In this way, when the input of the secondary collision load is further continued, the bolts 39F and 39R integrated with the inner column 22 overcome a frictional restraining force between the head portions 39*b* of the bolts 39F and 39R and the edge portion of the guide hole 34 and displace forward while leaving the hanger bracket 23. At this time, the shaft portion 39*a* of each of the bolts 39F and 39R moves forward along the guide hole 34 of the hanger bracket 23.

Figure 7:
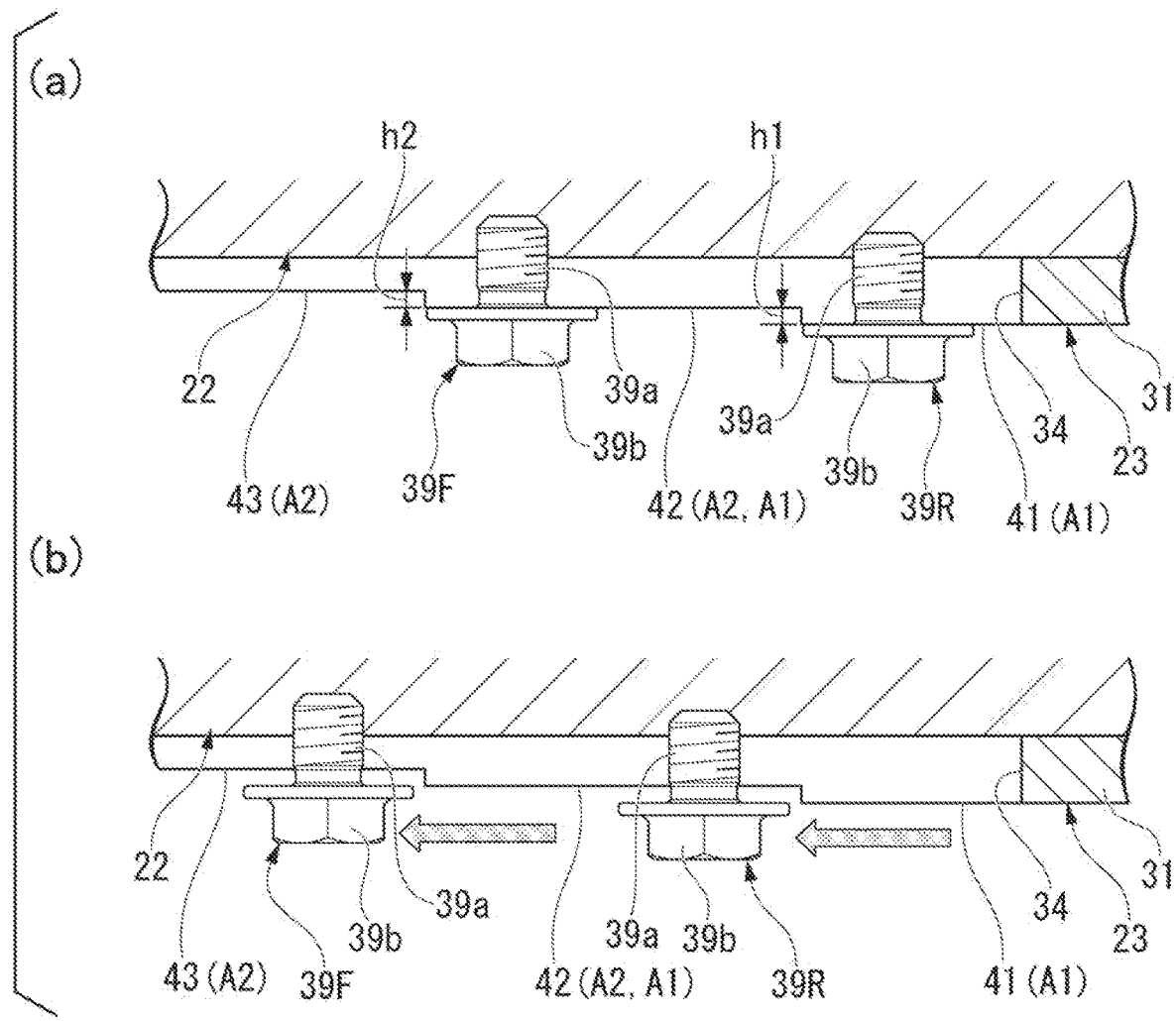
FIG. 7 is an enlarged cross-sectional view showing a pan of FIG. 5.

FIG. 7 is an enlarged cross-sectional view showing a part of FIG. 5. FIG. 7(*a*) shows a fixed state of the hanger bracket 23 and the inner column 22 by the bolts 39F and 39R, and FIG. 7(*b*) shows a relative displacement behavior between the hanger bracket 23 and the bolts 39F and 39R when the secondary collision load is input.

As shown in FIG. 6, the guide hole 34 formed in the attachment plate portion 31 of the hanger bracket 23 has a widened portion 34*a* disposed at an end portion on a rear side and a narrowed portion 34*b* extending forward from the widened portion 34*a* and having a width in the left-right direction narrower than a width of the widened portion 34*a*. When the hanger bracket 23 is fastened and fixed to the lower surface of the inner column 22, as shown in FIGS. 5 and 7(*a*), the shaft portion 39*a* of the bolt 39R on the rear side penetrates the widened portion 34*a* of the guide hole 34 in the vertical direction. The shaft portion 39*a* of the bolt 39F on the front side penetrates the narrowed portion 34*b* of the guide hole 34 in the vertical direction. At this time, when the shaft portion 39*a* of the bolts 39R and 39F is tightened to the inner column 22, the head portion 39*b* (the seat portion) of each of the bolts 39R and 39F is pressed against the left and right edge portions of the widened portion 34*a* and the narrowed portion 34*b* from a lower surface side. As a result, the hanger bracket 23 is fastened and fixed to the lower surface of the inner column 22.

Of the attachment plate portion 31 of the hanger bracket 23, the left and right edge portions of the widened portion 34*a* of the guide hole 34 are a first facing surface 41 with which the head portion 39*b* of the bolt 39R on the rear side comes into contact when the hanger bracket 23 is fixed to the inner column 22. Of the attachment plate portion 31, the left and right edge portions of a rear region of the narrowed portion 34*b* (a region adjacent to the front end portion of the widened portion 34*a*) of the guide hole 34 are a second facing surface 42 with which the head portion 39*b* of the bolt 39F on the front side comes into contact when the hanger bracket 23 is fixed to the inner column 22. As shown in FIG. 7(*a*), the second facing surface 42 has a protrusion height in a direction toward the head portion 39*b* of the bolt 39F (a downward protrusion height) lower than that of the first facing surface 41 by a set height h1. The head portion 39*b* of the bolt 39R on the rear side is disposed at a front end portion of the first facing surface 41 (a position adjacent to the second facing surface 42) in a state where the hanger bracket 23 is fixed to the inner column 22.

Of the attachment plate portion 31, the left and right edge portions of a front region of the narrowed portion 34*b* (a region separated forward from the widened portion 34*a*) of the guide hole 34 are a third facing surface 43 that has a protrusion height in a direction toward the head portion 39*b* of the bolt 39F (a downward protrusion height) lower than that of the second facing surface 42 by a set height h2. The head portion 39*b* of the bolt 39F on the front side is disposed at a front end portion of the second facing surface 42 (a position adjacent to the third facing surface 43) in a state where the hanger bracket 23 is fixed to the inner column 22.

In a case of the present embodiment, the first facing surface 41 of the edge portions of the guide hole 34 constitutes a first region A1 with which the head portion 39b (the seat portion) of the bolt 39R (the fixing member) comes into contact to fix the hanger bracket 23 to the inner column 22 regarding the fastening portion by the bolt 39R on the rear side. The second facing surface 42 of the edge portions of the guide hole 34 constitutes a second region A2 which the head portion 39b (the seat portion) of the bolt 39R (the fixing member) faces on the lower side due to the displacement of the inner column 22 along with the input of the secondary collision load regarding the fastening portion by the bolt 39R on the rear side.

The second facing surface 42 of the edge portions of the guide hole 34 constitutes the first region A1 with which the head portion 39b (the seat portion) of the bolt 39F (the fixing member) comes into contact to fix the hanger bracket 23 to the inner column 22 regarding the fastening portion by the bolt 39F on the front side. The third facing surface 43 of the edge portions of the guide hole 34 constitutes a second region A2 which the head portion 39b (the seat portion) of the bolt 39F (the fixing member) faces on the lower side due to the displacement of the inner column 22 along with the input of the secondary collision load regarding the fastening portion by the bolt 39F on the front side.

Here, regarding the fixing of the hanger bracket 23 and the inner column 22 by the bolt 39R on the rear side, the shaft portion 39a of the bolt 39R is tightened to the inner column 22, and thus the head portion 39b of the bolt 39R is pressed against the first facing surface 41 by a force corresponding to tightening torque. At this time, a frictional restraining force corresponding to the tightening of the bolt 39R acts between the first facing surface 41 of the hanger bracket 23 and the head portion 39b of the bolt 39R, and a frictional restraining force corresponding to the tightening of the bolt 39R also acts between the attachment plate portion 31 of the hanger bracket 23 and the lower surface of the inner column 22.

At the time of inputting the secondary collision load, when the hanger bracket 23 which moves forward integrally with the inner column 22 comes into contact with the lock bolt 53 at the stopper portion 32c, the bolt 39R tries to be displaced forward with respect to the stopped hanger bracket 23. At this time, the second facing surface 42 having a lower protrusion height than the first facing surface 41 is disposed in front of the first facing surface 41 of the hanger bracket 23. Therefore, when the secondary collision load for moving the bolt 39R forward together with the inner column 22 exceeds a predetermined value, as shown in FIG. 7(b), the bolt 39R is rapidly displaced forward, and the head portion 39b of the bolt 39R faces the second facing surface 42. Since the second facing surface 42 has a smaller frictional restraining force on the head portion 39b of the bolt 39R than the first facing surface 41, after the head portion 39b is displaced to a position opposite the second facing surface 42, the bolt 39R is smoothly displaced further forward along the guide hole 34.

Regarding the fixing of the hanger bracket 23 and the inner column 22 by the bolt 39F on the front side, the shaft portion 39a of the bolt 39F is tightened to the inner column 22, and thus the head portion 39b of the bolt 39F is pressed against the second facing surface 42 of the edge portion of the guide hole 34 by a force corresponding to tightening torque. At this time, the hanger bracket 23 receives a frictional restraining force from the head portion 39b of the bolt 39F pressed against the second facing surface 42 and also receives a frictional restraining force from the lower surface of the inner column 22.

At the time of inputting the secondary collision load, when the hanger bracket 23 which moves forward comes into contact with the lock bolt 53 at the stopper portion 32c, the bolt 39F on the front side tries to be displaced forward the with respect to the stopped hanger bracket 23 like the bolt 39R on the rear side. At this time, the third facing surface 43 having a lower protrusion height than the second facing surface 42 is disposed in front of the second facing surface 42. Therefore, when the secondary collision load exceeds a predetermined value, as shown in FIG. 7(b), the bolt 39F on the front side is rapidly displaced forward, and the head portion 39b of the bolt 39F faces the third facing surface 43. Since the third facing surface 43 has a smaller frictional restraining force on the head portion 39b of the bolt 39F than the second facing surface 42, after the head portion 39b is displaced to a position opposite the third facing surface 43, the bolt 39F is smoothly displaced further forward along the guide hole 34.

Figure 8:
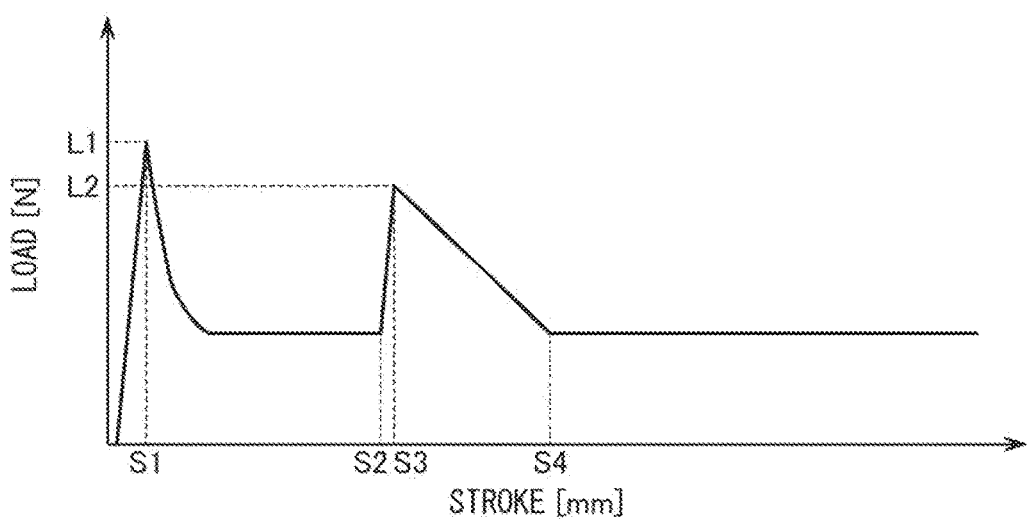
FIG. 8 is a characteristic diagram showing a relationship between a forward stroke of an inner column and a load acting between the inner column and an outer column when a secondary collision load is input in the steering device of the first embodiment.

FIG. 8 is a characteristic diagram showing a relationship between a forward stroke of the inner column 22 and a load acting between the inner column 22 and the outer column 21 when the secondary collision load is input in the steering device 1 of the present embodiment.

In FIG. 8, L1 is an operating load by which the inner column 22 begins to be displaced forward against the restraining force of the outer column 21 (the restraining force of the lock mechanism 15) due to the input of the secondary collision load, and S1 to S2 is a stroke in which the inner column 22 is displaced with respect to the outer column 21 in a telescopic operating range (a stroke until the stopper portion 32c comes into contact with the lock bolt 53). L2 is a load by which the stopper portion 32c comes into contact with the lock bolt 53 and an initial operating load by which the bolts 39R and 39F begin to be displaced forward together with the inner column 22 while leaving the hanger bracket 23. S3 to S4 is a stroke in which the head portion 39b of the bolt 39R on the rear side shifts from the position opposite the first facing surface 41 to the position opposite the second facing surface 42, and the head portion 39b of the bolt 39F on the front side shifts from the position opposite the second facing surface 42 to the position facing the third facing surface 43.

As shown in FIG. 8, when the secondary collision load is input, the initial operating load 12 is suppressed to be relatively low, and thus it is possible to smoothly perform shifting to a stroke range exceeding S4 where a damping load with respect to an input impact becomes substantially constant. In the stroke range exceeding S4, the energy of the secondary collision load can be stably absorbed.

Effect of Embodiment

In the steering device 1 of the present embodiment, the guide hole 34 which extends in the front-rear direction and through which the shaft portions 39a of the bolts 39R and 39F pass is formed in the hanger bracket 23, and the edge portion of the guide hole 34 is provided with the first region A1 against which the head portions 39b (the seat portions) of the bolts 39R and 39F are pressed to fix the hanger bracket 23 to the inner column 22 and the second region A2 which the head portions 39b of the bolts 39R and 39F face when the secondary collision load is input. Then, the frictional restraining force between the head portions 39b and the edge portion of the guide hole 34 in a state where the head portions 39b of the bolts 39R and 39F are displaced to the positions facing the second region A2 when the secondary collision load is input is set to be smaller than the frictional restraining force between the head portions 39b and the edge portion of the guide hole 34 in a state where the head portions 39b of the bolts 39R and 39F is pressed against the hanger bracket in the first region A1.

Therefore, when the secondary collision load is input, the posture of the inner column 22 can be stably maintained by the guiding action by the guide hole 34 of the hanger bracket 23 and the shaft portions 39a of the bolts 39R and 39F, and it is possible to smoothly displace the bolts 39R and 39F from the positions where the head portions 39b face the first region A1 of the hanger bracket 23 to the positions where the head portions 39b face the second region A2 of the hanger bracket 23. Therefore, in a case where the steering device 1 of the present embodiment is adopted, stable energy absorption performance can be obtained when the secondary collision load is input while the structure is simple and does not cause an increase in size or cost.

In particular, in the steering device 1 of the present embodiment, as a means for setting the frictional restraining force in the second region A2 to be smaller than the frictional restraining force in the first region A1, the protrusion height of the second region A2 (the protrusion height of the fixing member in a direction toward the seat portion) is made lower than the protrusion height of the first region A1. As a result, a frictional force acting between the head portions 39b of the bolt 39R and 39F and the edge portion of the guide hole 34 in the second region A2 is smaller than a frictional force acting between the head portions 39b of the bolts 39R and 39F and the edge portion of the guide hole 34 in the first region A1. Therefore, the steering device 1 having the present configuration has a simple configuration in which the protrusion height of the second region A2 is lower than the protrusion height of the first region A1, can keep the initial operating load relatively small when the secondary collision load is input, and can absorb the energy of the secondary collision load smoothly.

In the steering device 1 having the present configuration, since the protrusion height of the second region A2 of the hanger bracket 23 is lower than the protrusion height of the first region A1, when the head portions 39b of the bolts 39R and 39F are relatively displaced to the positions facing the second region A2 at the time of inputting the secondary collision load, a pressing load of the hanger bracket 23 against the inner column 22 by the head portions 39b is also reduced. As a result, the frictional resistance at the contact surface between the hanger bracket 23 and the inner column 22 becomes smaller. Therefore, in a case where the present configuration is adopted, the operation on a latter stage of the collapse stroke at the time of inputting the secondary collision load can be made smoother, and the energy absorption performance can be further improved.

In the present embodiment, the protrusion height of the second region A2 is made lower than the protrusion height of the first region A1, and thus the frictional restraining force in the second region A2 is set to be smaller than the frictional restraining force in the first region A1, but the means for setting the frictional restraining force in the second region A2 to be smaller than the frictional restraining force in the first region A1 is not limited to this. For example, the surface roughness of the lower surface of the second region A2 may be set to be smoother than the surface roughness of the lower surface of the first region A1. As a means for smoothing the surface roughness, for example, an appropriate coating agent may be applied to the lower surface of the friction region.

Further, in the steering device 1 of the present embodiment, the first region A1 and the second region A2 (the first facing surface 41, the second facing surface 42, and the third facing surface 43) of the hanger bracket 23 are formed of an integral metal member (a metal plate). Therefore, in a case where the present configuration is adopted, the first region A1 and the second region A2 having different protrusion heights can be easily formed on the hanger bracket 23 by press molding or the like, and the number of parts can be reduced.

The steering device 1 of the present embodiment adopts the bolts 39R and 39F, which are one mode of a fastening member, as a fixing member for fixing the hanger bracket 23 to the lower surface of the inner column 22. For the fastening member such as the bolts 39R and 39F, the tightening torque can be accurately managed by using a tool that can grasp the torque when tightening to the mating member. Therefore, in the steering device 1 having the present configuration, the frictional restraining force with respect to the hanger bracket 23 can be accurately set and adjusted by managing the tightening torque of the bolts 39R and 39F. Therefore, in a case where the present configuration is adopted, the hanger bracket 23 can be securely fixed to the inner column 22 during normal use, and stable energy absorption performance can be obtained when the secondary collision load is input.

In the steering device 1 of the present embodiment, the plurality of bolts 39R and 39F, which are fixing members, are disposed at positions of the inner column 22 separated from each other in the axial direction, and the hanger bracket 23 is fixed to the inner column 22 at a plurality of positions separated from each other in the axial direction by the bolts 39R and 39F. The edge portion of the guide hole 34 of the hanger bracket 23 is provided with the first region A1 and the second region A2 to correspond to each of the bolts 39R and 39F. Therefore, when the secondary collision load is input, the guide action by the shaft portion 39a of the fixing member and the guide hole 34, and the fixing and sliding at the seat portion (the head portion 39b) of the fixing member and the edge portion of the guide hole 34 can be shared by the plurality of bolts 39R and 39F. Therefore, in a case where the present configuration is adopted, the behavior (the collapse stroke) of the inner column 22 at the time of inputting the secondary collision load can be further stabilized.

In the steering device 1 of the present embodiment, since the hanger bracket 23 is fixed to the inner column 22 by the plurality of bolts 39R and 39F at positions separated in the front-rear direction, when the stopper portions 32c and 32b of the hanger bracket 23 come into contact with the lock bolt 53 (the displacement restricting portion), it is possible to prevent the end portions of the hanger bracket 23 in the front-rear direction from being separated (floating) from the inner column 22. Therefore, in a case where the present configuration is adopted, the commercial value of the steering device 1 for adjusting the front-rear position of the inner column 22 can be enhanced, and the operation of the hanger bracket 23 or the inner column 22 can be stabilized when the secondary collision load is input.

Second Embodiment

Figure 9:
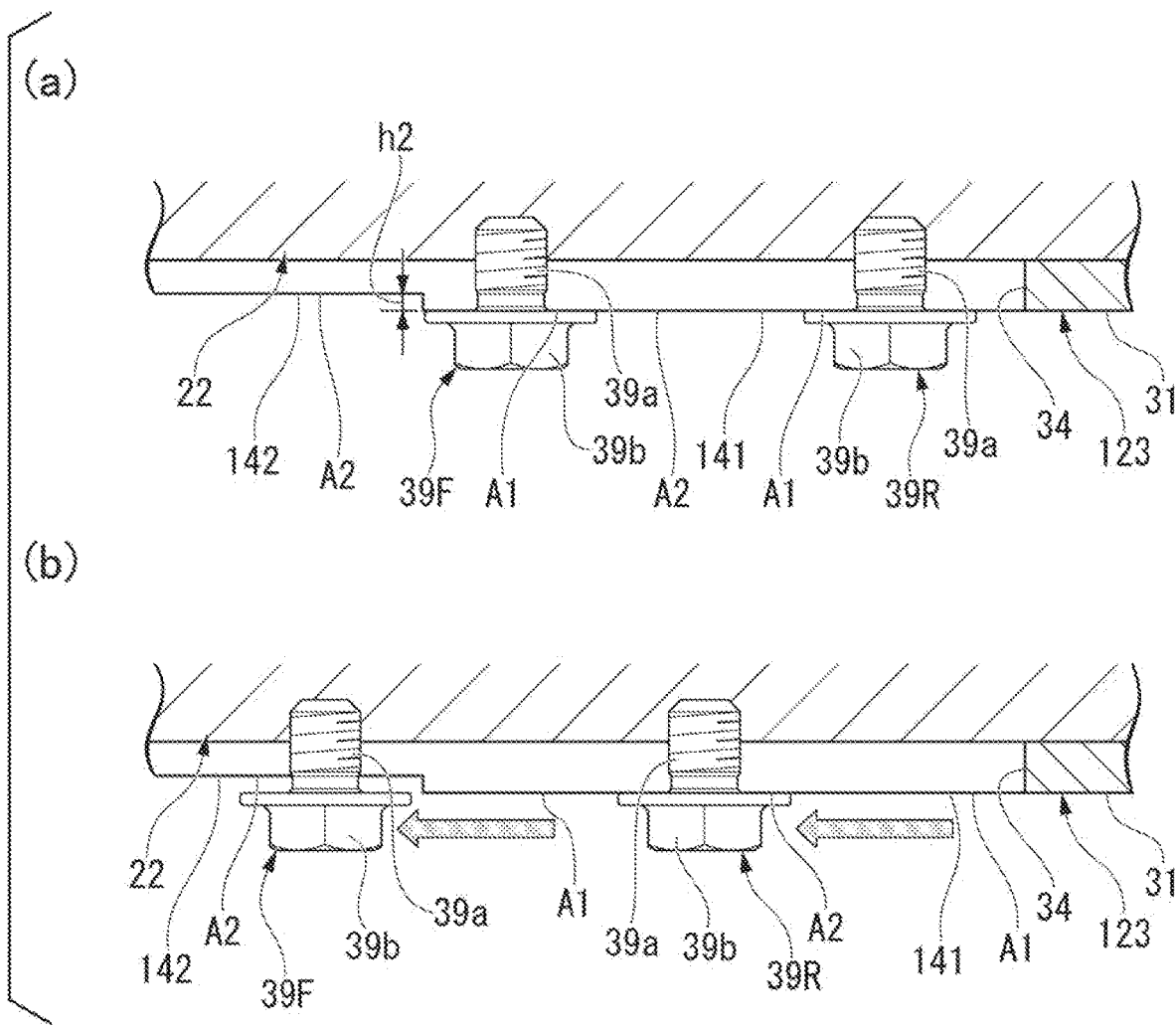
FIG. 9 is a cross-sectional view corresponding to FIG. 7 of a steering device of a second embodiment.

FIG. 9 is a cross-sectional view corresponding to FIG. 7 of the first embodiment of a steering device of a second embodiment. FIG. 9(a) shows a fixed state of a hanger bracket 123 and the inner column 22 by the bolts 39F and 39R, and FIG. 9(b) shows a relative displacement behavior between the hanger bracket 123 and the bolts 39F and 39R when the secondary collision load is input.

The steering device of the present embodiment differs from that of the first embodiment only in a structure of the hanger bracket 123 attached to the lower surface of the inner column 22.

Similar to the first embodiment, the hanger bracket 123 has the guide hole 34 formed in the attachment plate portion 31 in the front-rear direction. The left and right edge portions of the guide hole 34 have a first facing surface 141 disposed on the rear side and a second facing surface 142 disposed on the front side and having a protrusion height lower than that of the first facing surface 141 by a predetermined height h2.

As shown in FIG. 9(*a*), when the hanger bracket 123 is fixed to the inner column 22, both of the head portions 39*b* of the front and rear bolts 39F and 39R are pressed against the first facing surface 141 of the edge portions of the guide holes 34 by a force corresponding to the tightening torque. At this time, the head portion 39*b* of the bolt 39F on the front side is disposed at the front end portion (a position adjacent to the second facing surface 142) of the first facing surface 141.

On the other hand, when the bolts 39F and 39R are displaced forward together with the inner column 22 while leaving the hanger bracket 123 at the time of inputting the secondary collision load, as shown in FIG. 9(*b*), the head portion 39*b* of the bolt 39F on the front side faces the second facing surface 142. At this time, the head portion 39*b* of the bolt 39R on the rear side remains facing the first facing surface 141. Therefore, the frictional restraining force of the hanger bracket 123 by the head portion 39*b* of the bolt 39F on the front side is reduced, but the frictional restraining force of the hanger bracket 123 by the head portion 39*b* of the bolt 39R on the rear side is not reduced.

In a case of the present embodiment, a rear region of the first facing surface 141 of the edge portions of the guide hole 34 constitutes a first region A1 with which the head portion 39*b* (the seat portion) of the bolt 39R (the fixing member) comes into contact to fix the hanger bracket 123 to the inner column 22 regarding the fastening portion by the bolt 39R on the rear side. A front region of the first facing surface 141 constitutes a second region A2 which the head portion 39*b* (the seat portion) of the bolt 39R (the fixing member) faces on the lower side due to the displacement of the inner column 22 along with the input of the secondary collision load regarding the fastening portion by the bolt 39R on the rear side.

The front region of the first facing surface 141 constitutes the first region A1 with which the head portion 39*b* (the seat portion) of the bolt 39F (the fixing member) comes into contact to fix the hanger bracket 123 to the inner column 22 regarding the fastening portion by the bolt 39F on the front side. The second facing surface 142 constitutes a second region A2 which the head portion 39*b* (the seat portion) of the bolt 39F (the fixing member) faces on the lower side due to the displacement of the inner column 22 along with the input of the secondary collision load regarding the fastening portion by the bolt 39F on the front side.

Figure 10:
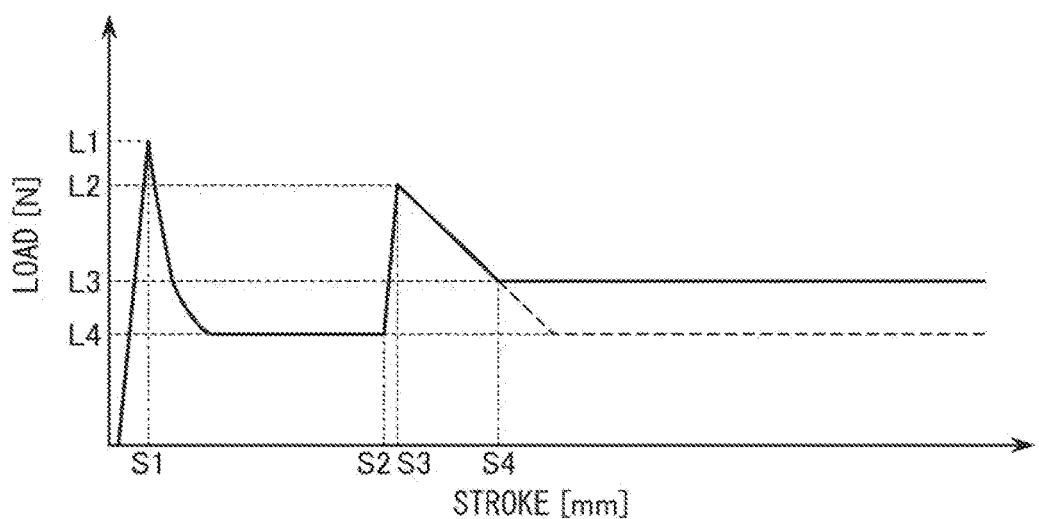
FIG. 10 is a characteristic diagram showing a relationship between a forward stroke of an inner column and a load acting between the inner column and an outer column when a secondary collision load is input in the steering device of the second embodiment.

FIG. 10 is a characteristic diagram showing a relationship between a forward stroke of the inner column 22 and a load acting between the inner column 22 and the outer column 21 when the secondary collision load is input in the steering device 1 of the present embodiment.

As shown in FIG. 10, when the secondary collision load is input, the inner column 22 is first displaced forward (S1 to S2) in the telescopic operating range, and then, when the hanger bracket 123 comes into contact with the lock bolt (the displacement restricting portion on the outer column), the bolts 39R and 39F begin to be displaced forward together with the inner column 22 leaving the hanger bracket 123. L2 in FIG. 10 is an initial operating load at this time.

After that, the head portion 39*b* of the bolt 39F on the front side is displaced from the position opposite the first facing surface 141 to the position opposite the second facing surface 142 (S3 to S4), and the operating load gradually decreases during this period. After that, when the head portion 39*b* of the bolt 39F on the front side completely faces the second facing surface 142, a damping load (L3) with respect to an input impact becomes substantially constant (L3). In the case of the present embodiment, the head portion 39*b* of the bolt 39R on the rear side always faces the first facing surface 141 regardless of the forward displacement of the inner column 22, and thus the frictional resistance by the head portion 39*b* of the bolt 39R on the rear side does not change. Therefore, the damping load (L3) after the bolts 39R and 39F begin to be displaced forward together with the inner column 22 while leaving the hanger bracket 123 is higher than that of the first embodiment. L4 in FIG. 10 is the damping load after the bolts 39R and 39F begin to be displaced forward in the case of the first embodiment.

Since the steering device of the present embodiment has substantially the same basic configuration as that of the first embodiment, the same basic effect as that of the first embodiment can be obtained.

However, in the steering device of the present embodiment, regarding the fastening portion by the bolt 39R on the rear side, the frictional restraining force due to the head portion 39*b* of the bolt 39R does not change whether the head 39*b* of the bolt 39R is in the fixed position or in the forward displacement state. That is, the frictional restraining force between the head portion 39*b* and the edge portion of the guide hole 34 in a state where the head portion 39*b* of the bolt 39R on the rear side is displaced to a position opposite the second region A2 is the same as the frictional restraining force between the head portion 39*b* and the edge portion of the guide hole 34 in the first region A1. Therefore, in the head portion 39*b* of the bolt 39R on the rear side, the frictional restraining force with respect to the hanger bracket 123 does not change at the initial stage of operation and the latter stage of operation when the secondary collision load is input. Therefore, when the configuration of the present embodiment is adopted, the sliding resistance in the latter stage of operation at the time of inputting the secondary collision load can be further increased, and the amount of energy absorbed during the collapse stroke can be increased.

Modification Example

Figure 11:
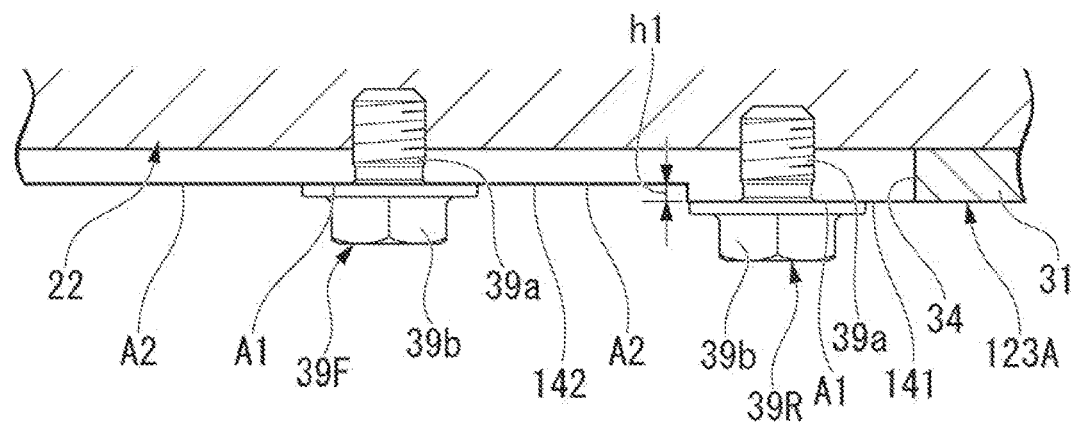
FIG. 11 is a cross-sectional view showing a modification example of the second embodiment, which is similar to FIG. 9(a).

FIG. 11 is a cross-sectional view showing a modification example of the second embodiment, which is similar to FIG. 9(*a*).

In a steering device of the present modification example, the configuration of a hanger bracket 123A is slightly different from that of the basic embodiment shown in FIG. 9.

Similar to the basic embodiment shown in FIL 9, the hanger bracket 123A of the present modification example has the first facing surface 141 and the second facing surface 142 having a protrusion height lower than that of the first facing surface 141 by a predetermined height h2 on the left and right edge portions of the guide hole 34. However, the hanger bracket 123A of the present modification example is fixed to the inner column 22 by bolts 39R and 39F in a state where the head portion 39*b* of the bolt 39R on the rear side comes into contact with the first facing surface 141, and the head portion 39b of the bolt 39F on the front side comes into contact with the second facing surface 142.

When the bolts 39F and 39R are displaced forward together with the inner column 22 at the time of inputting the secondary collision load, the head portion 39b of the bolt 39R on the rear side faces the second facing surface 142. At this time, the head portion 39b of the bolt 39F on the front side remains facing the second facing surface 142. Therefore, the frictional restraining force of the hanger bracket 123A by the head portion 39b of the bolt 39R on the rear side is reduced, but the frictional restraining force of the hanger bracket 123A by the head portion 39b of the bolt 39F on the front side is not reduced.

In the case of the present modification example, regarding the fastening portion by the bolt 39R on the rear side, the first facing surface 141 constitutes the first region A1, and the second facing surface 142 constitutes the second region A2. Regarding the fastening portion by the bolt 39F on the front side, a rear region of the second facing surface 142 constitutes the first region A1, and a front region of the second facing surface 142 constitutes the second region A2.

In the present modification example, in the head portion 39b of the bolt 39F on the front side, the frictional restraining force with respect to the hanger bracket 123A does not change at the initial stage of operation and the latter stage of operation when the secondary collision load is input. Therefore, even in the case of the present modification example, the sliding resistance in the latter stage of operation at the time of inputting the secondary collision load can be further increased, and the amount of energy absorbed during the collapse stroke can be increased.

Third Embodiment

Figure 12:
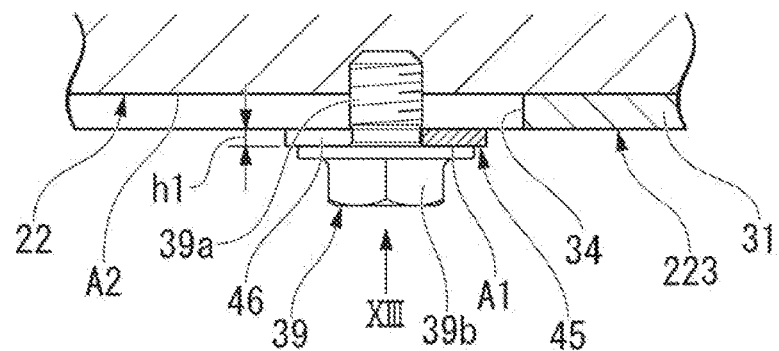
FIG. 12 is a vertical cross-sectional view of an attachment portion of a hanger bracket of a steering device of a third embodiment.
Figure 13:
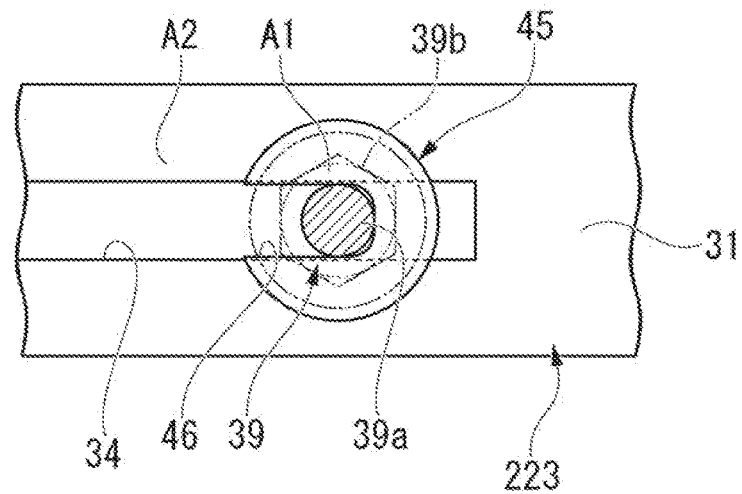
FIG. 13 is a view in a direction of an arrow XIII of FIG. 12.

FIG. 12 is a vertical cross-sectional view of an attachment portion of a hanger bracket 223 of a steering device of a third embodiment. FIG. 13 is view in a direction of an arrow XIII of FIG. 12 with a cross section of the shaft portion 39a of the bolt 39.

The steering device of the present embodiment differs from those of the first and second embodiments in a structure of the hanger bracket 223 attached to the lower surface of the inner column 22.

In the hanger bracket 223 of the present embodiment, a spacer member 45 having a constant thickness is disposed on a part of the lower surface of the attachment plate portion 31 having the guide hole 34. The spacer member 45 has a substantially U-shaped guide hole 46 that is open forward and is disposed on the lower surface side of the attachment plate portion 31 such that the guide hole 46 coincides with the guide hole 34 of the attachment plate portion 31 in the vertical direction. The spacer member 45 can be made of, for example, a washer-shaped metal plate having a substantially circular outer shape.

The spacer member 45 is interposed between the head portion 39b of the bolt 39 and the lower surface of the attachment plate portion 31 when the hanger bracket 223 is fixed to the inner column 22 by the bolt 39. At this time, the shaft portion 39a of the bolt 39 passes through the guide holes 46 and 34 of the spacer member 45 and the attachment plate portion 31 up and down, and the tip end portion thereof is tightened to the lower surface of the inner column 22.

In the present embodiment, an edge portion of the guide hole 46 of the spacer member 45 on a lower surface side constitutes the first region A1. That is, the head portion 39b (the seat portion) of the bolt 39 comes into contact with the edge portion of the guide hole 46 of the spacer member 45 on the lower surface side and is pressed against the edge portion, and thus the hanger bracket 223 is fixed to the inner column 22. In the present embodiment, of the edge portion of the guide hole 34 of the attachment plate portion 31 on the lower surface side, a portion in front of the spacer member 45 constitutes the second region A2. That is, of the edge portion of the guide hole 34 on the lower surface side, the portion in front of the spacer member 45 is disposed adjacent to the front side of the first region A1 and faces the head portion 39b when the head portion 39b of the bolt 39 is displaced forward together with the inner column 22 at the time of inputting the secondary collision load.

The lower surface of the second region A2 is lower than the lower surface of the first region A1 by the height h1 of the thickness of the spacer member 45. In the present embodiment, a portion constituting the first region A1 is constituted by a main body portion (the attachment plate portion 31) of the hanger bracket 223 and the spacer member 45 which is a separate body. In FIGS. 12 and 13, only one bolt 39 for fixing the hanger bracket 223 to the inner column 22 is shown, but a plurality of bolts 39 can be used as in the first and second embodiments. In this case, it is possible to use a stepped spacer member in which the protrusion height of the contact surface increases in a stepped manner toward the rear. A plurality of spacers having different protrusion heights of the contact surfaces may be used.

The steering device of the present embodiment has substantially the same configuration as that of the first embodiment except that the portion constituting the first region A1 is constituted by the spacer member 45. Therefore, in a case where the steering device of the present embodiment is adopted, substantially the same basic effect as that of the first embodiment described above can be obtained.

However, in the steering device of the present embodiment, since the portion constituting the first region A1 of the hanger bracket 223 is constituted by the spacer member 45 which is a separate body, it is possible to easily change the heights of the first region A1 and the second region A2 simply by arranging the spacer member 45 which is a separate body on the first region A1 of the hanger bracket 223. Therefore, in a case where the present configuration is adopted, the structure of the main body portion (a portion other than the spacer member 45) of the hanger bracket 223 can be simplified, and the productivity can be further improved.

Fourth Embodiment

Figure 14:
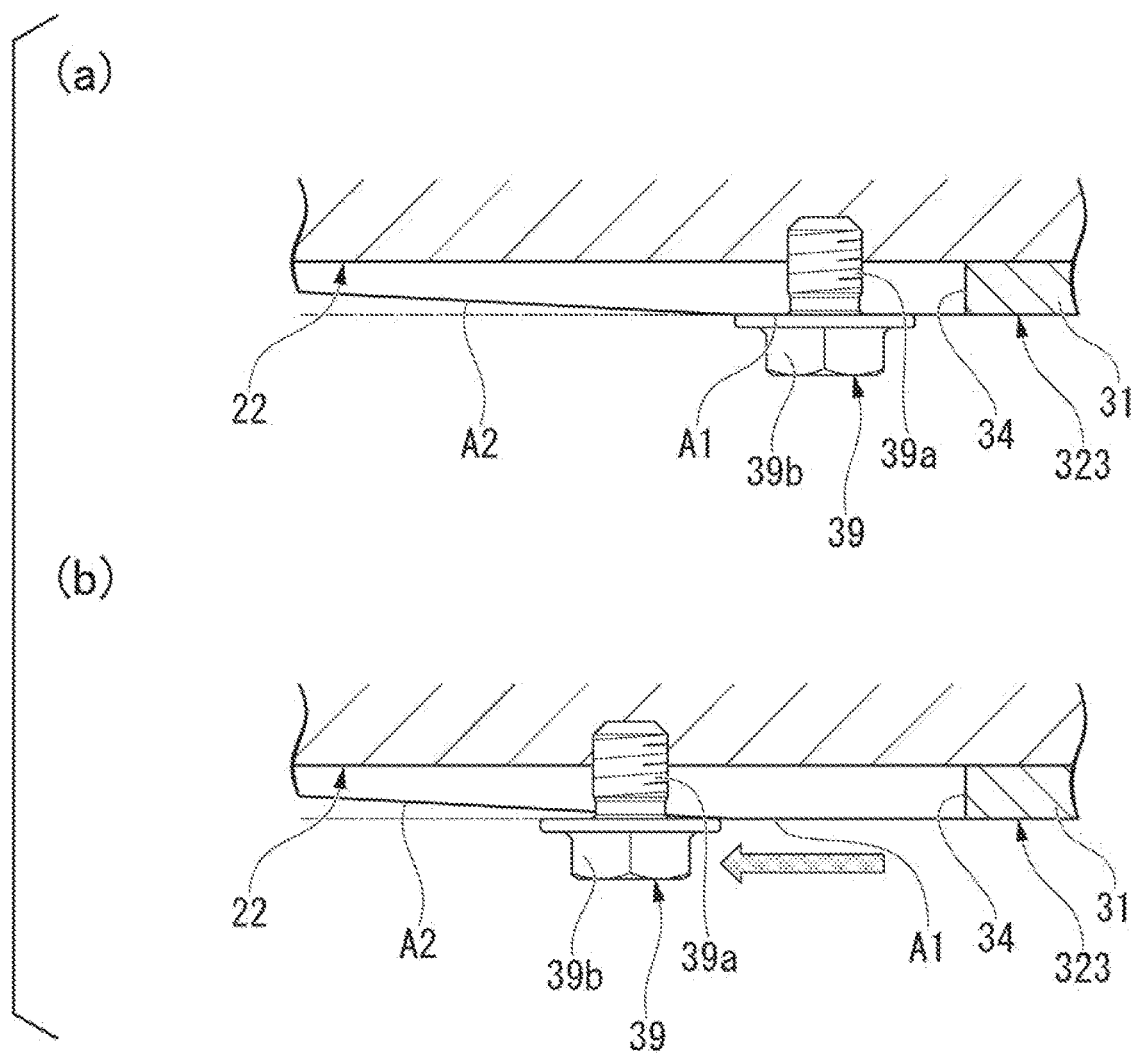
FIG. 14 is a vertical cross-sectional view of an attachment portion of a hanger bracket of a steering device of a fourth embodiment.

FIG. 14 is a vertical cross-sectional view of an attachment portion of a hanger bracket 323 of a steering device of a fourth embodiment. FIG. 14(a) shows a fixed state of the hanger bracket 323 and the inner column 22 by the bolt 39, and FIG. 14(b) shows a relative displacement behavior between the hanger bracket 323 and the bolt 39 when the secondary collision load is input.

The steering device of the present embodiment differs from those of the first to third embodiments in a structure of the hanger bracket 323 attached to the lower surface of the inner column 22.

In the hanger bracket 323 of the present embodiment, the edge portion of the guide hole 34 of the attachment plate portion 31 is provided with the first region A1 for fixing the hanger bracket 323 to the inner column 22 by a bolt 39 and a second region A2 which the head portion 39b of the bolt 39 faces when the secondary collision load is input. The second region A2 is disposed adjacent to the front side of the first region. In the first region A1, the protrusion height in a direction toward the head portion 39b of the bolt 39 is set to a constant height in the front-rear direction. On the other hand, in the second region A2, the protrusion height of the bolt 39 in a direction toward the head portion 39b gradually decreases toward a front side.

In the steering device of the present embodiment, when the head portion 39b of the bolt 39 is displaced from the position opposite the first region A1 to the position opposite the second region A2 at the time of inputting the secondary collision load, the frictional restraining force on the edge portion of the guide hole 34 by the head portion 39b of the bolt 39 is gradually reduced according to the forward displacement of the bolt 39 (the inner column 22). Therefore, when the steering device of the present embodiment is adopted, the displacement of the inner column 22 in the latter stage of the collapse stroke becomes smoother.

The present invention is not limited to the above embodiments, and various design changes can be made without departing from the gist thereof. For example, in the above embodiment, the hanger bracket is fixed to the inner column by two or one bolt, but the number of the fixing members for fixing the hanger bracket to the inner column may be three or more.

What is claimed is:

1. A steering device comprising:
   an inner column that rotatably supports a steering shaft;
   an outer column which is supported by a vehicle body in a state where displacement thereof in a front-rear direction is restricted and in which the inner column is inserted such that a position thereof can be adjusted in the front-rear direction;
   a hanger bracket that is attached to the inner column and has a stopper portion which restricts excessive displacement of the inner column by coming into contact with a displacement restricting portion on a side of the outer column when the inner column is displaced in the front-rear direction; and
   a fixing member that has a shaft portion which passes through the hanger bracket and of which one end side is coupled to the inner column and a seat portion which is provided on the other end side of the shaft portion to press and fix the hanger bracket against and to the inner column,
   wherein the hanger bracket has a guide hole which extends in the front-rear direction and through which the shaft portion of the fixing member passes,
   wherein an edge portion of the guide hole of the hanger bracket is provided with
   a first region with which the seat portion of the fixing member comes into contact to fix the hanger bracket to the inner column, and
   a second region which is disposed adjacent to a front side of the first region and faces the seat portion when the seat portion is displaced forward together with the inner column by a secondary collision load being input to the steering shaft, and
   wherein a frictional restraining force between the seat portion and the edge portion of the guide hole in a state where the seat portion is displaced to a position opposite the second region is set to be smaller than a frictional restraining force between the seat portion and the edge portion of the guide hole at a position where the seat portion faces the first region.

2. The steering device according to claim 1, wherein the second region is set to have a protrusion height in a direction toward the seat portion lower than that of the first region.

3. The steering device according to claim 2, wherein the first region and the second region are formed of an integral metal member.

4. The steering device according to claim 2, wherein a spacer member is disposed in the first region such that a height in the direction toward the seat portion is higher than that of the second region.

5. The steering device according to claim 1, wherein the fixing member is a fastening member capable of managing tightening torque.

6. The steering device according to claim 1,
   wherein a plurality of the fixing members are disposed at positions of the inner column separated from each other in an axial direction,
   wherein the hanger bracket is fixed at a plurality of positions of the inner column separated from each other in the axial direction by each of the fixing members, and
   wherein the hanger bracket is provided with the first region and the second region to correspond to each of the fixing members.

7. The steering device according to claim 6, wherein the second region corresponding to a part of the fixing member is configured such that the frictional restraining force between the seat portion and the edge portion of the guide hole in a state where the seat portion of the fixing member is displaced to a position opposite the second region is the same as the friction binding force between the seat portion and the edge portion of the guide hole in the first region.

8. The steering device according to claim 1, wherein the second region has a protrusion height in a direction toward the seat portion gradually decreasing from a rear end portion toward a front side.

* * * * *